US012579278B2

(12) United States Patent
Betthauser et al.

(10) Patent No.: US 12,579,278 B2
(45) Date of Patent: Mar. 17, 2026

(54) AD-HOC GRAPH PROCESSING FOR SECURITY EXPLAINABILITY

(71) Applicant: MICROSOFT TECHNOLOGY LICENSING, LLC, Redmond, WA (US)

(72) Inventors: Leo Moreno Betthauser, Redmond, WA (US); Andrew White Wicker, Redmond, WA (US); Bryan (Ning) Xia, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 162 days.

(21) Appl. No.: 18/312,159

(22) Filed: May 4, 2023

(65) Prior Publication Data

US 2024/0370570 A1     Nov. 7, 2024

(51) Int. Cl.
| | |
|---|---|
| *G06F 21/57* | (2013.01) |
| *G06F 16/901* | (2019.01) |
| *G06N 3/045* | (2023.01) |
| *G06N 3/09* | (2023.01) |

(52) U.S. Cl.
CPC ........ G06F 21/577 (2013.01); G06F 16/9024 (2019.01); G06N 3/045 (2023.01); G06N 3/09 (2023.01); *G06F 2221/034* (2013.01)

(58) Field of Classification Search
CPC .............. G06F 21/577; G06F 16/9024; G06F 2221/034; G06N 3/045; G06N 3/09; H04L 63/1425; H04L 63/1433
See application file for complete search history.

(56) References Cited

U.S. PATENT DOCUMENTS

| | | | |
|---|---|---|---|
| 2017/0032130 A1* | 2/2017 | Joseph Durairaj | ........................ H04L 63/1416 |
| 2018/0034836 A1* | 2/2018 | Chen | ................... H04L 63/1425 |

(Continued)

OTHER PUBLICATIONS

"LogIntelligence / NeuralLog", Retrieved From: https://github.com/LogIntelligence/NeuralLog, Apr. 28, 2021, 5 Pages.

(Continued)

*Primary Examiner* — Thomas A Gyorfi
(74) *Attorney, Agent, or Firm* — David Foster; Newport IP, LLC

(57) ABSTRACT

Disclosed is a machine learning model architecture that leverages existing large language models to analyze log files for security vulnerabilities. In some configurations, log files are processed by an encoder machine learning model to generate embeddings. Embeddings generated by the encoder model are used to construct graphs. The graphs are in turn used to train a graph classifier model for identifying security vulnerabilities. The encoder model may be an existing general-purpose large language model. In some configurations, the nodes of the graphs are the embedding vectors generated by the encoder model while edges represent similarities between nodes. Graphs constructed in this way may be pruned to highlight more meaningful node topologies. The graphs may then be labeled based on a security analysis of the corresponding log files. A graph classifier model trained on the labeled graphs may be used to identify security vulnerabilities.

20 Claims, 8 Drawing Sheets

(56)          References Cited

U.S. PATENT DOCUMENTS

| | | | |
|---|---|---|---|
| 2021/0248443 A1* | 8/2021 | Shu | G06F 16/9024 |
| 2023/0208869 A1* | 6/2023 | Bisht | G06N 7/01 |
| | | | 726/23 |

OTHER PUBLICATIONS

"Sbousseaden / EVTX-Attack-Samples", Retrieved From: https://github.com/sbousseaden/EVTX-ATTACK-SAMPLES, Jan. 24, 2023, 4 Pages.

"Sentence Transformers Documentation", Retrieved From: https://www.sbert.net/, Retrieved on: Jul. 29, 2022, 7 Pages.

Le, et al., "Log-based Anomaly Detection Without Log Parsing", In Repository of arXiv:2108.01955v3, Aug. 31, 2021, 13 Pages.

Liu, et al., "Log2vec: A Heterogeneous Graph Embedding Based Approach for Detecting Cyber Threats within Enterprise", In Proceedings of the ACM SIGSAC Conference on Computer and Communications Security, Nov. 6, 2019, pp. 1777-1794.

Wang, et al., "Language Models are Open Knowledge Graphs", In Repository of arXiv:2010.11967v1, Oct. 22, 2020, 30 Pages.

Yang, et al., "GraphFormers: GNN-nested Transformers for Representation Learning on Textual Graph", In Repository of arXiv:2105.02605v2, Sep. 30, 2021, 12 Pages.

Ying, et al., "Do Transformers Really Perform Badly for Graph Representation?", In Repository of arXiv:2106.05234v5, Nov. 24, 2021, 19 Pages.

Cochard, et al., "Investigating Graph Embedding Methods for Cross-Platform Binary Code Similarity Detection," IEEE 7th European Symposium on Security and Privacy, Jun. 6, 2022, pp. 60-73.

Haopeng, et al., "Graph Learning: A Comprehensive Survey and Future Directions," In Repository of arXiv:2212.08966, Dec. 17, 2022, 27 Pages.

International Search Report and Written Opinion received for PCT Application No. PCT/US2024/025893, Jul. 16, 2024, 13 pages.

Zerhoudi, et al., "Improving Intrusion Detection Systems using Zero-Shot Recognition via Graph Embeddings," IEEE 44th Annual Computers, Software, and Applications Conference, Jul. 13, 2020, pp. 790-797.

International Preliminary Report on Patentability (Chapter I) received for PCT Application No. PCT/US2024/025893, mailed on Nov. 13, 2025, 10 pages.

* cited by examiner

OBTAIN SETS OF EMBEDDINGS FOR SETS OF INPUTS
602

CONSTRUCT GRAPHS FROM THE SETS OF INPUTS
604

LABEL THE GRAPHS BASED ON A CLASSIFICATION
CRITERIA 606

TRAIN A GRAPH CLASSIFIER MACHINE LEARNING
MODEL WITH THE LABELED GRAPHS 608

CLASSIFY ANOTHER SET OF INPUTS USING THE
TRAINED GRAPH CLASSIFIER MACHINE LEARNING
MODEL 610

Figure 8:
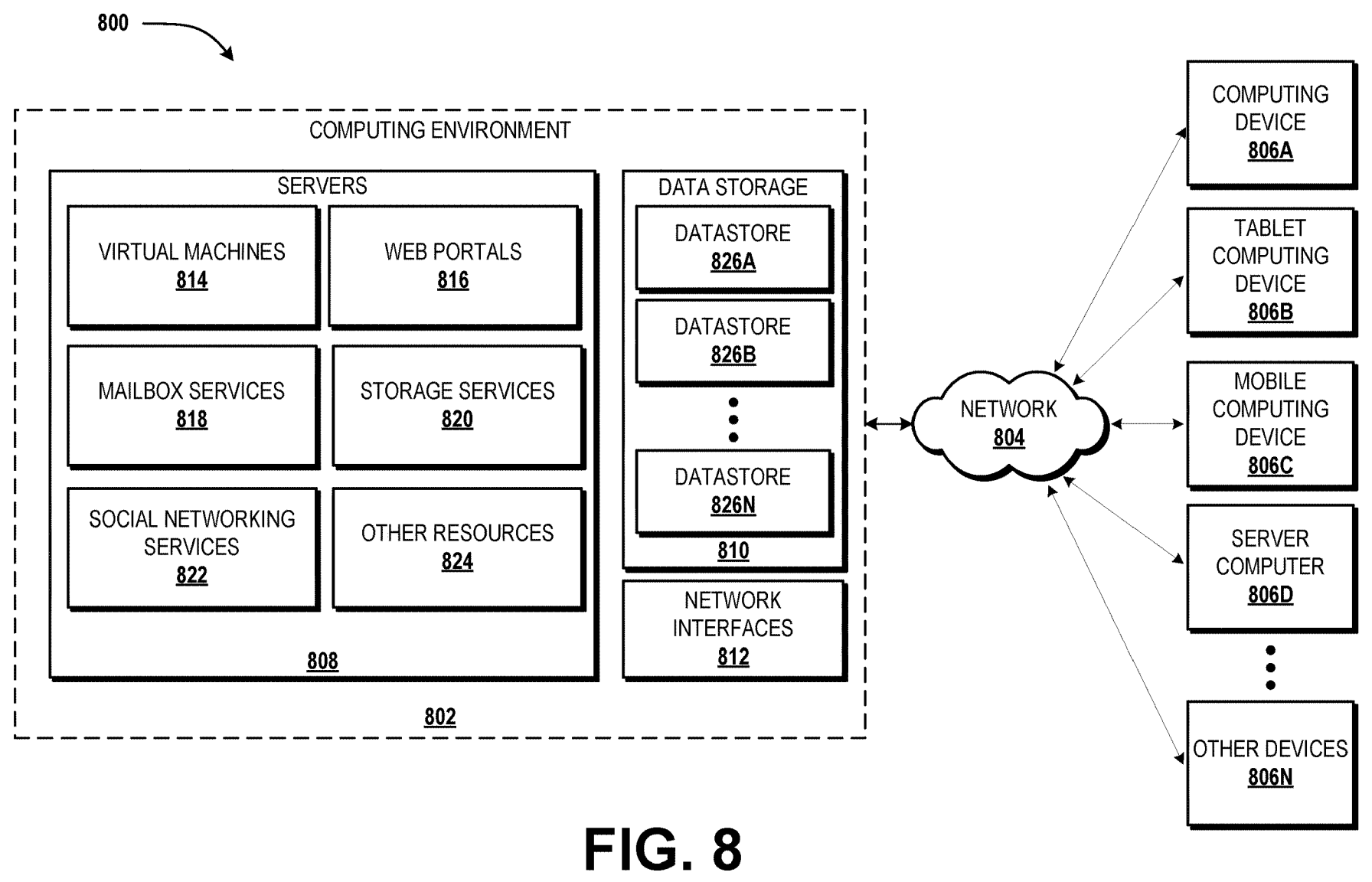

COMPUTING DEVICE 806A

TABLET COMPUTING DEVICE 806B

MOBILE COMPUTING DEVICE 806C

SERVER COMPUTER 806D

OTHER DEVICES 806N

NETWORK 804

COMPUTING ENVIRONMENT

DATA STORAGE

DATASTORE 826A

DATASTORE 826B

DATASTORE 826N

810

NETWORK INTERFACES 812

SERVERS

WEB PORTALS 816

STORAGE SERVICES 820

OTHER RESOURCES 824

VIRTUAL MACHINES 814

MAILBOX SERVICES 818

SOCIAL NETWORKING SERVICES 822

AD-HOC GRAPH PROCESSING FOR SECURITY EXPLAINABILITY

BACKGROUND

Graphs-nodes connected by edges—are often employed in security applications to represent relationships and interactions among security-related entities. Graphs may be derived from raw signals such as log files, network traffic, user behavior, or other security-related data sources. Representing this information as a graph makes it easier for users to analyze, visualize, and understand complex interconnections within the data.

However, constructing these graphs presents several challenges. Typically, raw data is parsed to extract meaningful entities and relationships. Databases may also be queried to gather additional information or verify existing data. These processes can be prone to data quality issues. For example, parsing errors may occur when parsing the raw data, especially if the data format is complex, unstructured, or inconsistent. This can lead to inaccurate or incomplete extraction of entities and relationships, which may adversely affect the graph's quality. By improving the graph construction process, security applications can better leverage the power of graphs to provide accurate and meaningful context for users.

It is with respect to these and other considerations that the disclosure made herein is presented.

SUMMARY

Disclosed is a machine learning model architecture that leverages existing large language models to analyze log files for security vulnerabilities. In some configurations, log files are processed by an encoder machine learning model to generate embeddings. Embeddings generated by the encoder model are used to construct graphs. The graphs are in turn used to train a graph classifier model for identifying security vulnerabilities. The encoder model may be an existing general-purpose large language model. In some configurations, the nodes of the graphs are the embedding vectors generated by the encoder model while edges represent similarities between nodes. Graphs constructed in this way may be pruned to highlight more meaningful node topologies. The graphs may then be labeled based on a security analysis of the corresponding log files. A graph classifier model trained on the labeled graphs may be used to identify security vulnerabilities.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 8 is a diagram illustrating a distributed computing environment capable of implementing aspects of the techniques and technologies presented herein.

DETAILED DESCRIPTION

Figure 1:
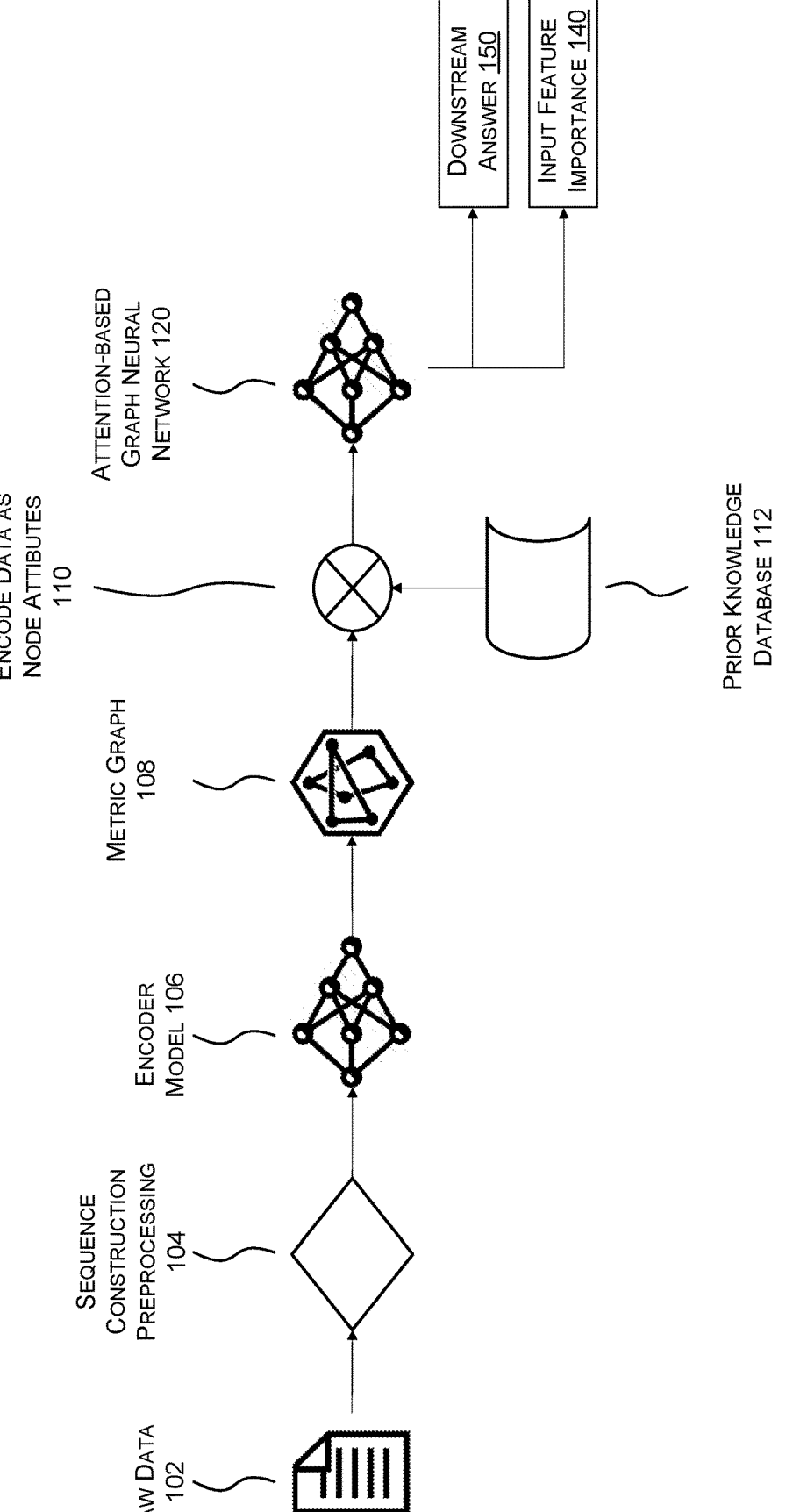
FIG. 1 illustrates a high-level overview of using raw data to train a graph classifier model with which to identify security vulnerabilities.

One existing technique for constructing a graph out of raw signal data is to process the data directly with a machine learning model. For example, a large language model may be used to perform named entity recognition and relationship extraction on the raw data. Entities and relationships identified by the model may then be used to construct a graph that visualizes key aspects of the raw data.

While using LLMs to extract named entities and relationships has proven useful, these LLMs can grow considerably in size as more tasks are encoded into the model weights. This makes the models very computationally expensive. Another issue with using named entity recognition and relationship extraction to create a graph is that LLMs can only handle a limited number of input tokens. For example, some LLMs may only process input sequences of 512 tokens at a time, which might only be equivalent to around 128 words or a few sentences. This constraint often becomes an issue in the security space where logs tend to be significantly larger than the capacity of LLMs.

To address these limitations, instead of continuing to expand the allowable input size, a hierarchical approach using multiple ML models may be applied. The first model, referred to herein as an encoder model, processes the raw input. The encoder model generates outputs that are used to construct graphs. These graphs are then used to train a second model. The second model is used to infer something about a new piece of raw data, such as classifying the raw data as anomalous.

By constructing the graph and using a downstream model to reason over it, users can quickly and cheaply iterate over different graph topologies and bootstrap signal from existing encoder models. This enables the resolution of the analysis to be changed from the level of individual embeddings to the level of entire raw inputs. The downstream model is typically a much smaller model than the encoder model, and so adjusting the graph topology or retraining the downstream model is faster and cheaper than re-training the encoder model. Iterating over different graph topologies and/or downstream models leverages large encoder models that have processed a vast amount of data. The graph representation serves as a tool to approximate and make sense of the complex structure of the embeddings generated by the encoder model, enabling better analysis and understanding of their relationships.

For example, some configurations augment a large language model, effectively using the LLM as a preprocessor, and then training the second model based on the embeddings generated by the LLM. For instance, embeddings generated by the LLM may be used to construct a graph that visualizes the raw data. Graphs constructed in this way may then be used to train a graph classifier model, which is one example of the second model. When using the trained graph classifier model to infer something about a new piece of raw data the LLM first preprocesses the new piece of raw data. Embeddings generated by the LLM may be used to construct a graph, and the trained graph classifier model may use the graph to perform the operation it was trained to do, such as identifying anomalous raw data.

This approach is flexible about the types of data it can process. Text input may be processed by large language models, but images, audio, and any other raw data formats may similarly be preprocessed by other types of ML models. The embeddings generated by these models may then be used to construct graphs which may be pruned/augmented/altered before being used to train a graph neural network.

In order to avoid processing the entire raw input at once, the raw input may be segmented into portions which are processed by the encoder model individually. For example, embeddings may be generated for every word or every line of the raw input, among other delineations. This overcomes the input token size limitations of LLMs by allowing a file to be broken down into constituent parts for processing instead of trying to train a model on large monolithic inputs. In the domain of computer security one common task applied to raw data, such as logs, is anomaly detection. In these situations, logs may be chunked into individual log lines for processing by the LLM.

Embeddings generated by the LLM are represented as vectors. Each embedding vector generated by the LLM is represented by a vertex in a graph. An embedding vector in isolation lacks information of how the input relates to relevant data, but relationships between embeddings can help contextualize the input with respect to a broader corpus. Embedding vectors are typically generated such that similar subsets of the raw data have embeddings that are close to one another in the embedding space. Closeness in this context may refer to a Euclidian distance or a cosine similarity on a hypersphere, or the like. The property that similar embeddings are closer in the embedding space allows an analysis of embedding vectors to reveal clusters or local information such as density or expected angles to nearest neighbors. Clusters may reveal sentences that have a similar topic, or sentences that share a similar relationship between a noun and a verb.

Encoding similarity with closeness lends itself to some embodiments such as anomaly detection, because closeness can be quantified. This allows a secondary system to be built on top of the embeddings generated by the LLM, such as defining graphs with nodes and edges, and then training a second model on the graphs.

In some configurations if two embeddings are closer in the embedding space they are meant to be more similar. But it is not always clear the threshold that determines if two embeddings qualify as "similar." Two embeddings may be very far apart in the embedding space, but that does not mean they are necessarily more dissimilar than two closer embeddings. In order to allow for this ambiguity, graph representations are constructed from the embeddings. This reveals an approximate manifold or an approximate shape. This shape may then be reasoned over, e.g., by training a graph classifier model.

What constitutes similarity may vary based on what parameters were used to train the LLM. For example, if the LLM was trained to be cognizant of IP addresses, then the LLM may deem raw data that contains the same IP address to be similar. The corresponding embedding vectors will appear closer in the embedding space. The LLM may similarly be trained to associate particular entities, formats, or other aspects of the raw data.

In the case of security logs, an embedding may be created for each log line. In some configurations, a sub-set of log lines are encoded, such as a sub-set of log lines that are flagged by an anomaly detection algorithm. Similarity in the context of log lines may be based on factors like IP addresses, entity types, data formats, or the like, depending on how the LLM was trained.

In some configurations, edges in the graph are pruned, for example, using a k-nearest neighbor (KNN) algorithm. In some configurations the metric graph may be constructed as a complete graph-every embedding is represented by a node in the graph, and every node is connected by an edge to every other node. From this starting point edges may be pruned, such as with the KNN algorithm. In addition to or as an alternative to pruning edges based on the KNN algorithm, edges may be pruned if a distance between the nodes exceeds a threshold distance, e.g., the edge between the nodes has less than a threshold similarity score. In some configurations pruning algorithms are combined, such as first pruning based on KNN, and then further pruning edges that exceed a threshold distance.

Graph construction may be adjusted by the selection of a strategy to prune edges. Edge pruning is used to affect graph construction because nodes are generated by the encoding model and therefore are not directly configurable. As discussed briefly above, how the encoder model is trained may affect which similarities the model identifies, which may affect the topology of the resulting graphs. However, adjusting how the encoder model is trained is expensive and time consuming, and so it is often quicker and cheaper to adjust how edges are pruned instead.

As discussed above, while embedding vectors that are close together in embedding space are similar, embedding vectors that are relatively far apart from each other are not necessarily dissimilar. Conversely, not all vectors that are k-nearest neighbors are necessarily similar. For example, every node in the graph will have k-nearest neighbors, even outlier nodes that are significantly further away from any other pair of vertices. As such, a combination of k-nearest neighbor, threshold-based, and other techniques may be applied to determine which vertices of the graph should be connected.

Raw input data may be labeled. This label may be used when training the second machine learning model along with the graphs. In the context of security logs, labels may indicate whether a sequence of log lines is anomalous and/or whether a particular line of the sequence of log lines is anomalous. Labels may be created by an external service, manual grading, or any variety of sources.

Raw input may be labeled as anomalous in contexts other than security. For example, anomalous sentiments may be identified by a model trained to perform sentiment analysis.

In some configurations, instead of a graph classifier model, sentiment analysis may be performed by training a graph sentiment model on the graphs constructed from embeddings generated by the encoder model.

One advantage of the disclosed embodiments is the ability to find anomalies associated with portions of the raw input, as opposed to identifying the entire raw input as anomalous. This is enabled by generating embeddings for chunks of the raw input, e.g., log lines of a log file, instead of training on the entire raw input as a whole. The ability to identify anomalous portions of the raw input increases explainability because the user may be presented with the specific anomalous log line. When applied to sentiment analysis, chunking the raw input into paragraphs or sentences makes it possible to analyze individual sentences or paragraphs instead of the document as a whole or tokenized substrings. This finer-grained level of analysis allows the discovery of sentiment subtleties over sentences or paragraphs. While some existing models can point to sub portions of the raw input, these sub portions are predetermined by costly model training and are typically partial words whose importance is non-trivial to combine. Chunking into paragraphs or sentences avoids these limitations.

At the same time, it is often difficult to identify a particular portion of the raw input as anomalous in isolation. In the context of a security analysis, an attempt to access a secure location within a computing system may be a legitimate operation performed by an administrator or a suspicious operation performed by a hacker. Constructing a graph out of the embeddings of a sequence of log lines allows the graph classifier model to reason over the attempt to access the secure location in the context of actions described by surrounding log lines. The structure provided by the graph originates in the similarities of the embeddings generated by the encoder model.

FIG. 1 illustrates a high-level overview of using raw data to train a graph classifier model with which to identify security anomalies. Raw data 102 is processed by sequence construction preprocessing 104. Raw data 102 maybe one or more log files, each of which includes log lines. Log files are commonly used to record operating system and application events. Some log files are focused on security events such as logins, permission requests, and the like. Other log files may record the usage of system resources such as file creation, network connections, etc. While log files consisting of individual log lines are used as examples throughout this document, other types of raw data are similarly contemplated, such as log files that store data as a table. Furthermore, raw data 102 may not be stored in a file, but may be streamed, obtained from a database, etc. Raw data 102 may include text, images, or any other type of raw data that may be processed by a machine learning model.

Sequence construction preprocessing 104 processes raw data 102 into a format that is usable by encoder model 106. for example, sequence construction preprocessing 104 may split a log file into log lines to be processed by encoder model 106.

Encoder model 106 may refer to any type of machine learning model. In some configurations, encoder model 106 is a large language model implemented with a Transformer architecture. Encoder model 106 receives raw data 102 having been pre-processed by sequence construction preprocessing 104. Encoder model 106 infers an embedding vector for each subset of raw data 102 presented by sequence construction preprocessing 104. For example, encoder model 106 may generate an embedding for each line in a log file.

Metric graph construction 108 takes the embedding vectors generated by encoder model 106 and constructs a graph. Specifically, encode data as node attributes 110 constructs the graph such that nodes represent embedding vectors. The metric graph may begin as a fully-connected graph, but may optionally be pruned by applying distance/similarity thresholds, k-nearest neighbor clustering, or other pruning algorithms. Prior knowledge database 112 may provide additional information for nodes in the graph. For example, if a set of logs contained common entities such as source IP addresses, destination IP addresses, and/or event identifiers, additional edges may be constructed between vertices of the metric graph based on shared entity values. These edges are in addition to edges constructed based on distances between vertices in the embedding space.

For the system being logged, different usage patterns are reflected in different topologies of the metric graph 108 after pruning. For example, a document management system may log user actions such as creating a file, opening another file, deleting a file, creating a folder, etc. Log lines describing these actions may be converted by encoder model 106 into embeddings that reflect that this type of user action is ordinary. At the same time, a recursive delete operation may generate a large number of delete operations in a small amount of time, the user may upload a file, and/or the user may grant permissions to a different user. A security researcher or other trustworthy source may label some or all of these actions as anomalous. The corresponding metric graph of embedding vectors generated from these log lines, in conjunction with the anomalous label, trains the downstream model to identify similar sequences of events as anomalous.

In some configurations, attention-based graph neural network 120 is trained from multiple metric graphs that were generated from multiple raw inputs 120. Raw data 102 may be associated with an outcome that is relevant to training graph neural network 120. These outcomes may be used to label the metric construction graphs. For example, if a subject matter expert has determined that a log file contains log lines that indicate a security vulnerability, then the corresponding metric graph that is generated from that log file may be labeled as such. These labelled graphs may be used when training attention-based graph neural network 120 to reinforce when a graph is or is not indicative of the outcome.

Downstream answer 150 represents the output of graph neural network 120. When graph neural network is a graph attention network, the output is a vector for each vertex of the graph, as well as an N×N matrix of attention weights, where N is the number of vertices in the graph.

Input feature importance 140 may be computed by adding an artificial node called a classification vertex to metric graph 108. By default, the classification vertex is connected to every other vertex. This yields a ranked value between 0 and 1 for each given vertex which represents how important that neighbor for model training to a given vertex. Since all vertices are connected to the classification vertex, sorting based on these importance values determines input feature importance 140, i.e., which nodes, and therefore which chunks of raw data 102, contributed the most to downstream answer 150. The chunks of raw data 102 that contributed most to the downstream answer 150, e.g., the log lines that contributed most to an identification of a security anomaly, may be reported to an end user for further investigation.

Figure 2:
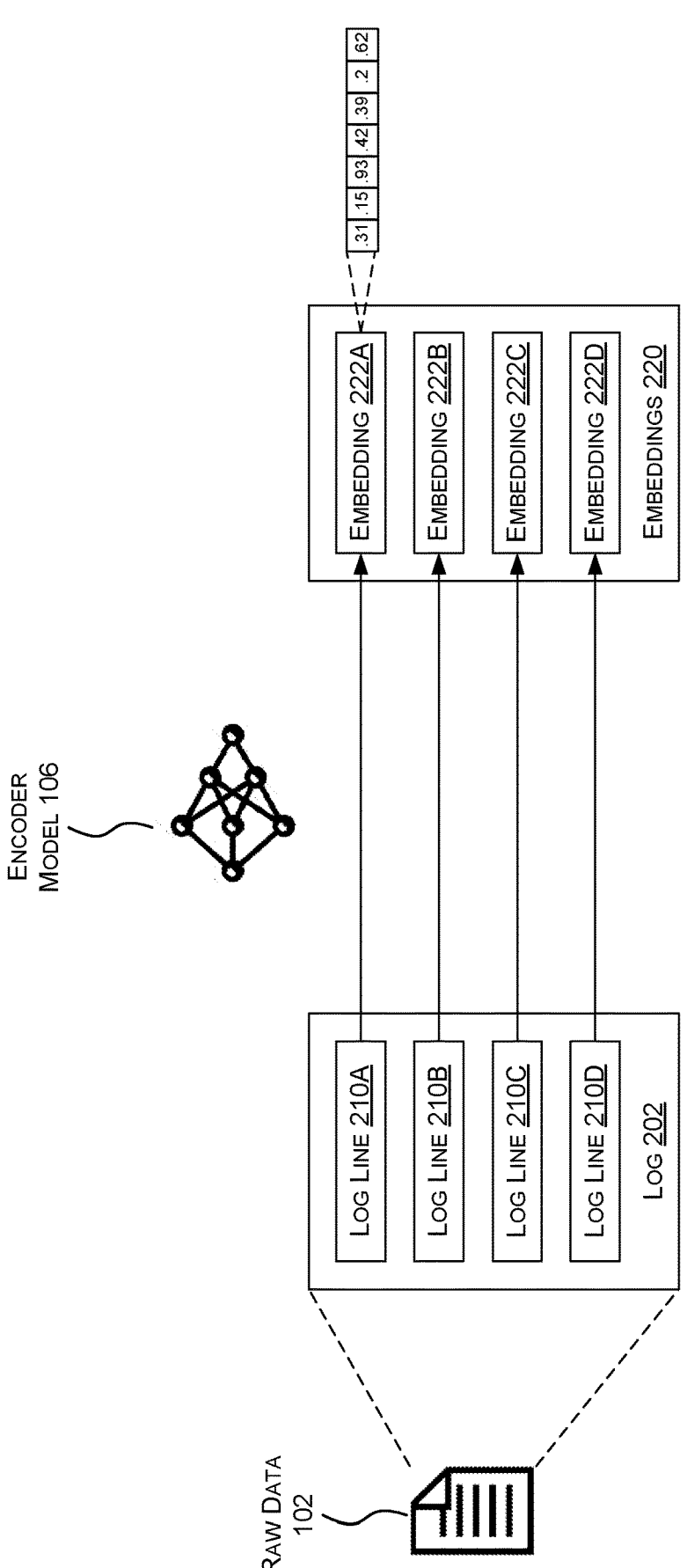
FIG. 2 illustrates using an encoder model to generate embeddings from log lines within a log file.

FIG. 2 illustrates using an encoder model to generate embeddings from log lines within a log file. In this example, raw data 102 is a log 202. Log 202 includes log lines 210.

Encoder model 106 may process each of log lines 210 into corresponding embeddings 222. Each embedding 222 may be represented by a vector of floating-point numbers. Embeddings 222 are typically used for indexing and lookup, or as input to a decoder module that generates text.

Figure 3:
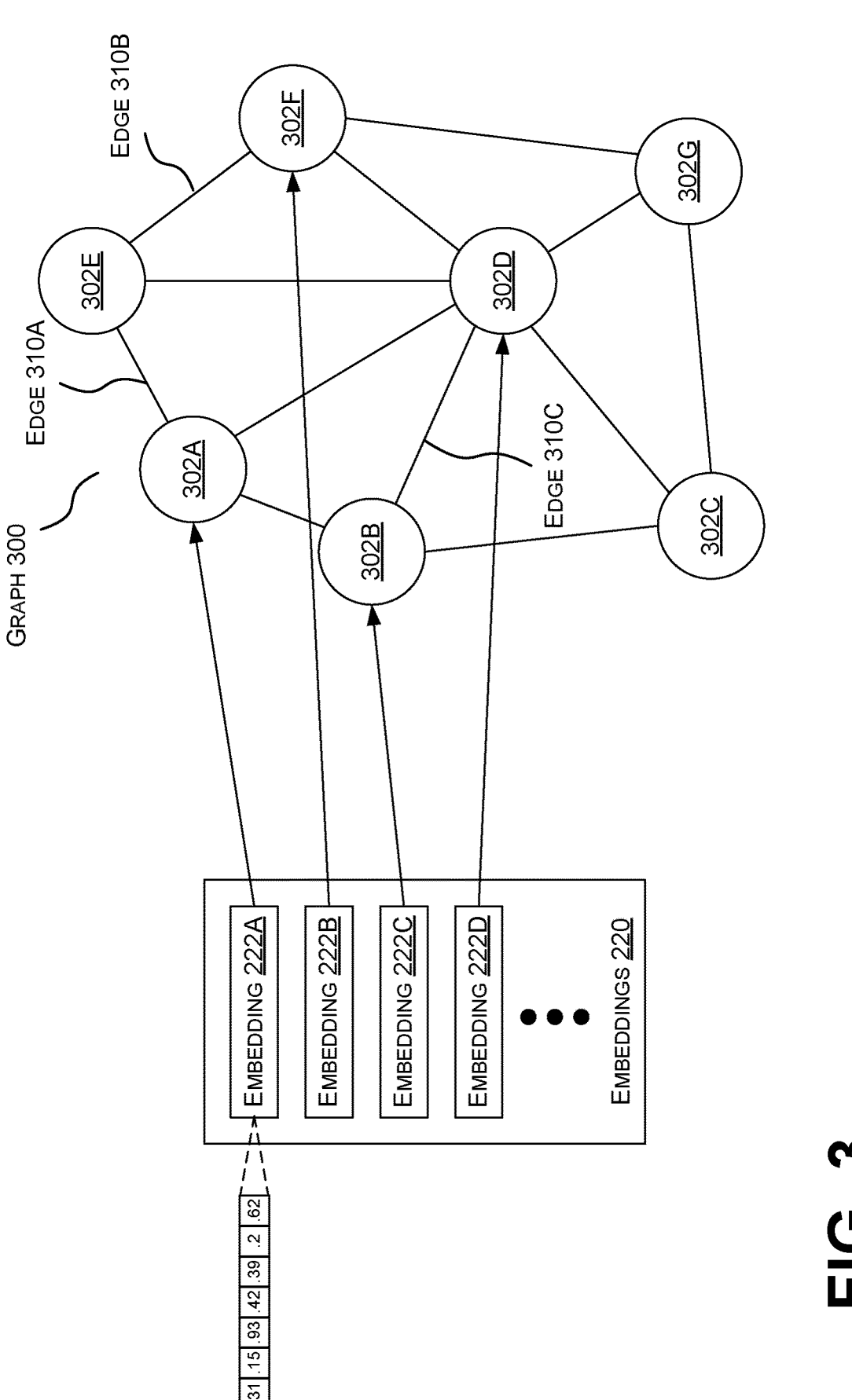
FIG. 3 illustrates a graph with nodes constructed from embeddings generated by the encoder model.

FIG. 3 illustrates a graph 300 with nodes 302 constructed from embeddings 222 generated by encoder model 106. As illustrated, embeddings 222 are represented by nodes 302. In some configurations, graph 300 includes a node 302 for each embedding 222. Furthermore, in some configurations, an edge 310 is created for every pair of nodes 302 in graph 300. Each edge 310 of graph 300 indicates a similarity-a measure of closeness of the log lines that generated the nodes 302 that an edge 310 connects.

Figure 4:
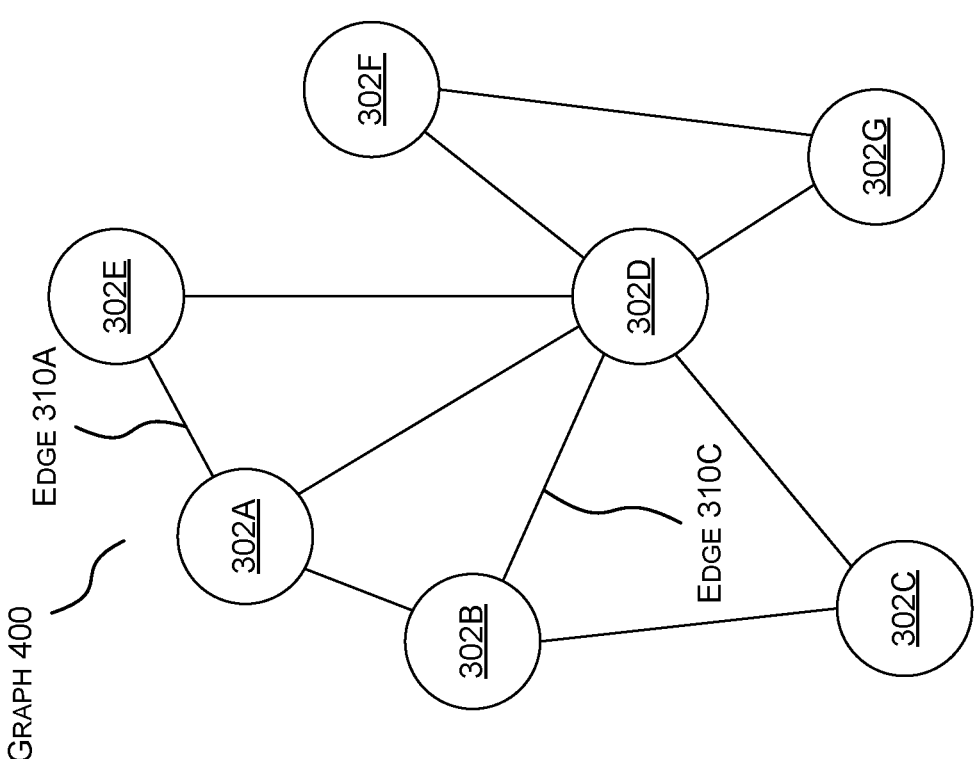
FIG. 4 illustrates the graph after having pruned some edges.

FIG. 4 illustrates graph 400 after having pruned some edges. As discussed briefly above, graph 300 may be pruned so that some edges 310 that were created during the construction of graph 300 are removed. Edges 310 with similarity scores below a threshold may be removed. In other configurations, a K-nearest-neighbor algorithm may be applied to remove edges from a particular node when the edge does not connect to one of that node's K nearest neighbors.

Figure 5:
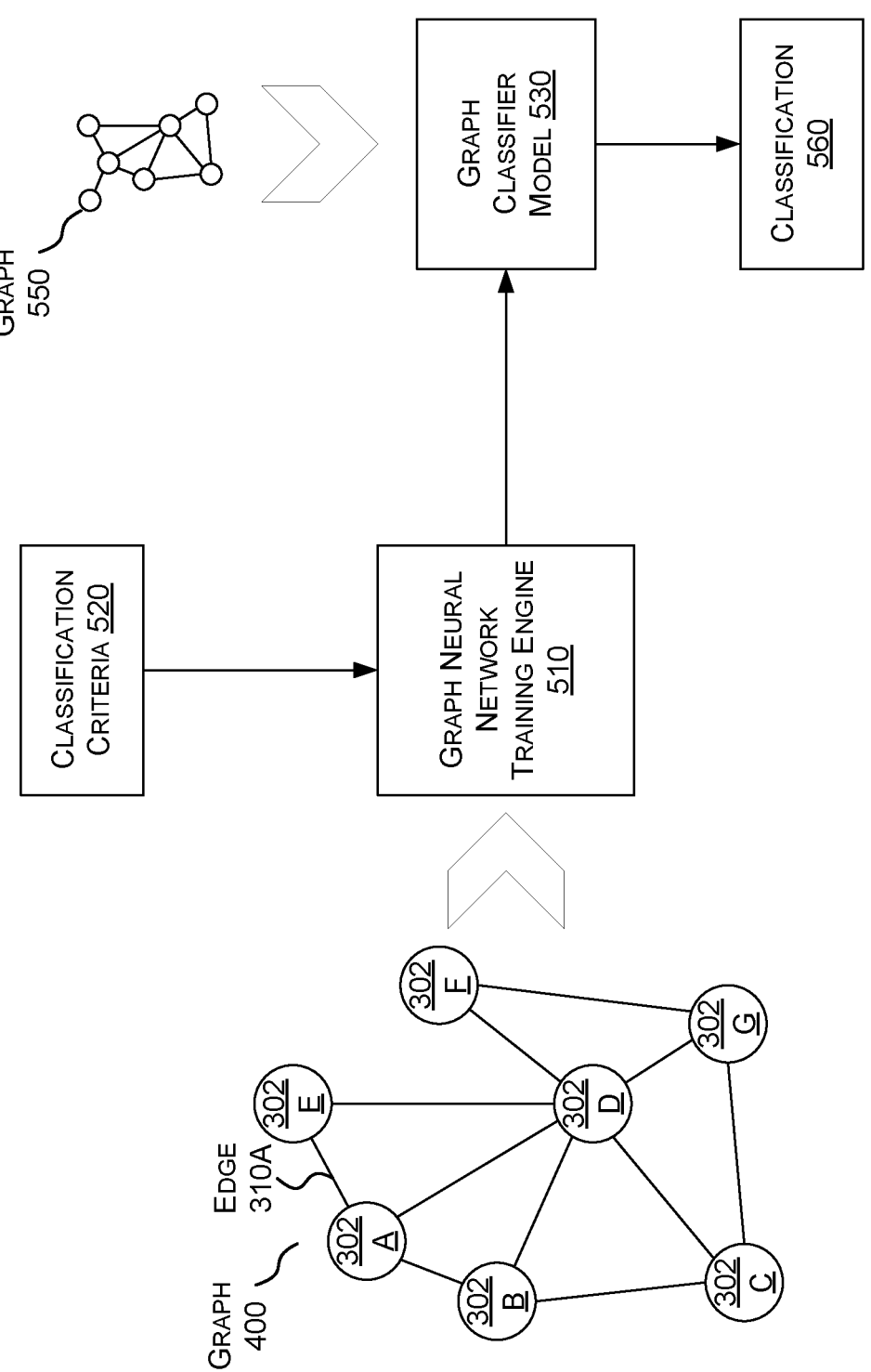
FIG. 5 illustrates training a graph classifier model with graphs derived from embeddings generated by the encoder model.

FIG. 5 illustrates training a graph classifier model 530 with graphs 400 derived from embeddings 222 generated by the encoder model 106. Specifically, graph neural network training engine 510 may receive multiple graphs 400 and corresponding classification criteria 520. Graph neural network training engine 510 may apply back propagation and other established techniques to learn which topographies of graph 400 meet the classification criteria 520. Graph neural network training engine 510 may generate a graph convolutional neural network, a graph attention transformer, or any other type of neural network that accepts graphs as input.

Once graph classifier model 530 has been generated, inference may be used to generate classification 560. As illustrated, graph 550 is a graph generated from raw input 102 that was not used to train graph classifier model 530. Classification 560 is a prediction made by graph classifier model 530 as to whether graph 550 satisfies classification criteria 520. For example graph 550 may represent a log file, and classification 560 may indicate whether the log file is indicative of a security vulnerability.

Graph classifier model 530 is one example of a type of graph neural network (GNN) that may be used to infer an output from graphs 400. However, other types of graph neural networks are similarly contemplated. For example, instead of labeling a graph 400 based on the raw data 102 used train it, graph 400 could be encoded and used to index content contained in raw data 102.

Figure 6:
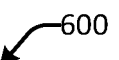
FIG. 6 is a flow diagram of an example method for ad-hoc graph processing for security explainability.
Figure 6:
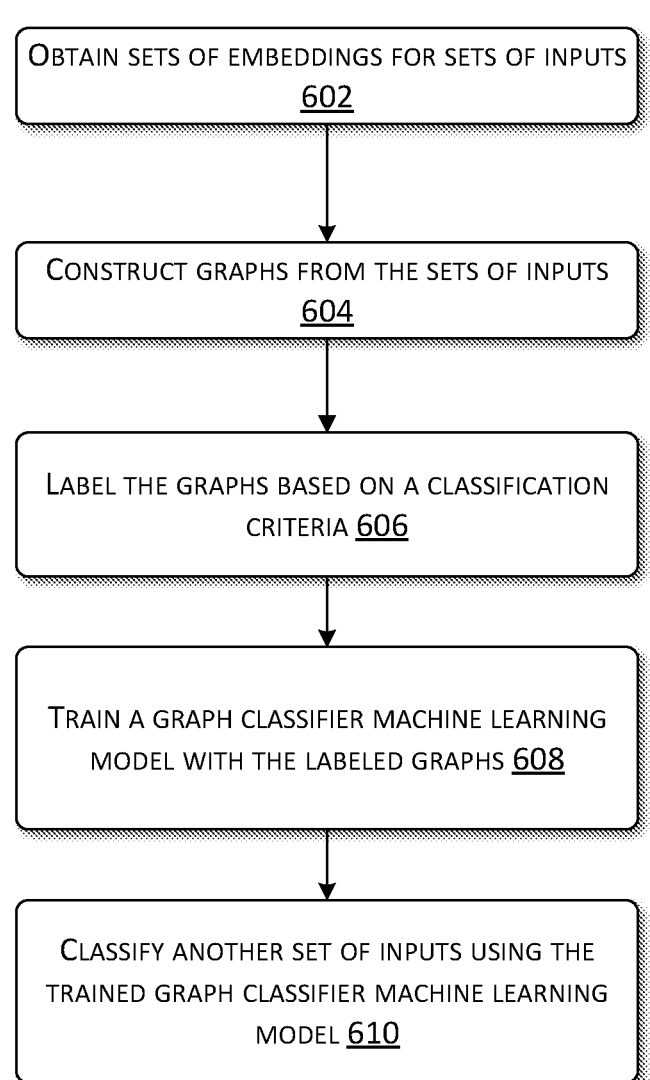

With reference to FIG. 6, routine 600 begins at operation 602, where sets of embeddings 222 are obtained for log line inputs 210. For example, log line inputs 210 may be lines of text emitted into a security log. The security log may record security-relevant events that have happened on a computing device, such as file access, network access, starting and stopping of services, although any type of event is similarly contemplated. Log lines may be displayed on screen as a single line, but a single log line may be displayed across multiple lines when rendered on the screen. A log line may refer to any portion of the log, and any delimiter may be used to delineate lines within the log.

Next at operation 604, graphs 300 are constructed from the set of inputs 210. The nodes of the graph 302 may be based on the embeddings 222, and the edges 310 of the graph 300 may reflect a distance between two nodes 302.

For example, each log line may be processed by a large language model to generate an embedding. Each embedding may be treated as a vertex in the graph 302, such that each vertex exists in an N-dimensional space, where N is the number of elements of the embedding vectors.

Next at operation 606, graphs 300 are labeled based on a classification criteria 520 that was associated with raw input 102. In a security context, classification criteria may indicate if the log line is deemed suspicious. Suspiciousness may be based on a manual evaluation of the log line, alone or in the context of the entire log, e.g., as part of a post-mortem analysis of a security breach. For example, a log line may be deemed suspicious if a destination IP address is to an area known for phishing attacks. Log lines may also be deemed suspicious based on repetition of operations such as password changes, file access, privilege escalation, or other sensitive operations. Log lines may also be deemed suspicious based on an automated analysis.

Next at operation 608, a graph classifier machine learning model 530 is trained from labeled graphs 400. The graph classifier machine learning model may be trained using the labeled classification criteria. In the context of a security analysis of a security log this may mean training the graph classifier model on whether a log line was deemed suspicious.

Next at operation 610, once trained, graph classifier machine learning model 530 may be used to classify another set of raw inputs. In the security analysis context, a log file may be processed as during training into a sequence of embedding vectors. These embedding vectors are used to construct a graph, which is then fed into the graph classifier machine learning model 530 to infer whether one or more of log lines has a security anomaly.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 600 may be also implemented in many other ways. For example, the routine 600 may be implemented, at least in part, by a processor of another remote computer or a local circuit. In addition, one or more of the operations of the routine 600 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 7:
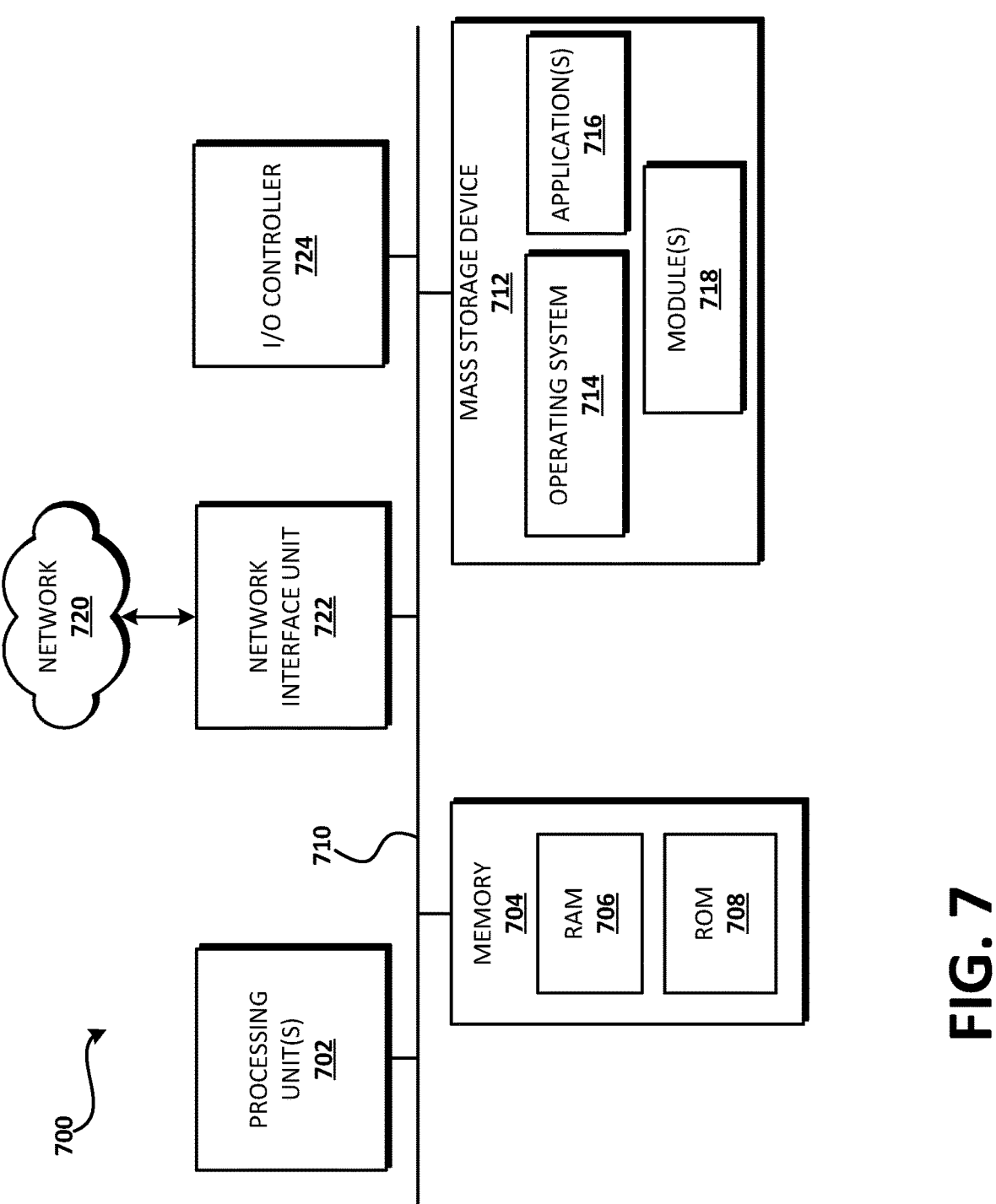
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a device, such as a computer or a server configured as part of the systems described herein, capable of executing computer instructions (e.g., a module or a program component described herein). The computer architecture 700 illustrated in FIG. 7 includes processing unit(s) 702, a system memory 704, including a random-access memory 706 ("RAM") and a read-only memory ("ROM") 708, and a system bus 710 that couples the memory 704 to the processing unit(s) 702.

Processing unit(s), such as processing unit(s) 702, can represent, for example, a CPU-type processing unit, a GPU-type processing unit, a field-programmable gate array (FPGA), another class of digital signal processor (DSP), a neural processing unit, or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), Neural processing unit, etc.

A basic input/output system containing the basic routines that help to transfer information between elements within the computer architecture 700, such as during startup, is stored in the ROM 708. The computer architecture 700 further includes a mass storage device 712 for storing an operating system 714, application(s) 716, modules 718, and other data described herein.

The mass storage device 712 is connected to processing unit(s) 702 through a mass storage controller connected to the bus 710. The mass storage device 712 and its associated computer-readable media provide non-volatile storage for the computer architecture 700. Although the description of computer-readable media contained herein refers to a mass storage device, it should be appreciated by those skilled in the art that computer-readable media can be any available computer-readable storage media or communication media that can be accessed by the computer architecture 700.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 700 may operate in a networked environment using logical connections to remote computers through the network 720. The computer architecture 700 may connect to the network 720 through a network interface unit 722 connected to the bus 710. The computer architecture 700 also may include an input/output controller 724 for receiving and processing input from a number of other devices, including a keyboard, mouse, touch, or electronic stylus or pen. Similarly, the input/output controller 724 may provide output to a display screen, a printer, or other type of output device.

It should be appreciated that the software components described herein may, when loaded into the processing unit(s) 702 and executed, transform the processing unit(s) 702 and the overall computer architecture 700 from a general-purpose computing system into a special-purpose computing system customized to facilitate the functionality presented herein. The processing unit(s) 702 may be constructed from any number of transistors or other discrete circuit elements, which may individually or collectively assume any number of states. More specifically, the processing unit(s) 702 may operate as a finite-state machine, in response to executable instructions contained within the software modules disclosed herein. These computer-executable instructions may transform the processing unit(s) 702 by specifying how the processing unit(s) 702 transition between states, thereby transforming the transistors or other discrete hardware elements constituting the processing unit(s) 702.

FIG. 8 depicts an illustrative distributed computing environment 800 capable of executing the software components described herein. Thus, the distributed computing environment 800 illustrated in FIG. 8 can be utilized to execute any aspects of the software components presented herein. For example, the distributed computing environment 800 can be utilized to execute aspects of the software components described herein.

Accordingly, the distributed computing environment 800 can include a computing environment 802 operating on, in communication with, or as part of the network 804. The network 804 can include various access networks. One or more client devices 806A-806N (hereinafter referred to collectively and/or generically as "clients 806" and also referred to herein as computing devices 806) can communicate with the computing environment 802 via the network 804. In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802.

In various examples, the computing environment 802 includes servers 808, data storage 810, and one or more network interfaces 812. The servers 808 can host various services, virtual machines, portals, and/or other resources. In the illustrated configuration, the servers 808 host virtual machines 814, Web portals 816, mailbox services 818, storage services 820, and/or, social networking services 822. As shown in FIG. 8 the servers 808 also can host other services, applications, portals, and/or other resources ("other resources") 824.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more servers configured to host data for the computing environment 802. The data storage 810 can include, host, or provide one or more real or virtual datastores 826A-826N (hereinafter referred to collectively and/or generically as "datastores 826"). The datastores 826 are configured to host data used or created by the servers 808 and/or other data. That is, the datastores 826 also can host or store web page documents, word documents, presentation documents, data structures, algorithms for execution by a recommendation engine, and/or other data utilized by any application program. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The present disclosure is supplemented by the following example clauses:

Example 1: A method comprising: obtaining a plurality of sets of embeddings for a plurality of sets of inputs; constructing a plurality of graphs from the plurality of sets of embeddings, wherein an individual graph of the plurality of graphs comprises nodes associated with an individual set of embeddings of the plurality of sets of embeddings, and wherein edges of the individual graph represent similarities between nodes of the individual graph; labeling the plurality of graphs based on a classification criteria; training a graph classifier machine learning model on the plurality of labeled graphs; and classifying another set of inputs using the trained graph classifier machine learning model.

Example 2: The method of Example 1, wherein a set of inputs of the plurality of sets of inputs comprises a plurality of text snippets.

Example 3: The method of Example 2, wherein the plurality of text snippets comprise a plurality of log lines.

Example 4: The method of Example 1, wherein the similarity between two nodes of the individual graph is computed based on a cosine similarity of the two nodes or a Euclidian distance of the two nodes.

Example 5: The method of Example 1, further comprising: pruning edges from the individual graph based on a threshold similarity value.

Example 6: The method of Example 1, further comprising: pruning edges from the individual graph based on a k-nearest-neighbor algorithm.

Example 7: The method of Example 1, wherein the plurality of sets of inputs comprise a plurality of sets of log lines, and wherein the classification criteria of an individual graph of the plurality of graphs is based on whether an individual set of log lines of the plurality of sets of log lines has been determined to be associated with a security anomaly.

Example 8: A computer-readable storage medium having computer-executable instructions stored thereupon that, when executed by a processing system, cause the processing system to: obtain a plurality of sets of embeddings for a plurality of sets of inputs; construct a plurality of graphs from the plurality of sets of embeddings, wherein an individual graph of the plurality of graphs comprises nodes associated with an individual set of embeddings of the plurality of sets of embeddings, and wherein edges of the individual graph represent similarities between nodes of the individual graph; label the plurality of graphs based on a classification criteria; and train a graph classifier machine learning model on the plurality of labeled graphs.

Example 9: The computer-readable storage medium of Example 8, wherein the plurality of sets of embeddings are generated from the plurality of sets of inputs by an encoder machine learning model.

Example 10: The computer-readable storage medium of Example 9, wherein the encoder machine learning model comprises a Transformer-based model that encodes inputs of the set of inputs into embedding vectors.

Example 11: The computer-readable storage medium of Example 10, wherein the graph classifier machine learning model comprises a graph convolutional network architecture, a graph attention transformer, or a graph neural network.

Example 12: The computer-readable storage medium of Example 8, wherein a graph of the plurality of graphs is classified based on a classification of the set of inputs of the plurality of sets of inputs used to construct the graph.

Example 13: The computer-readable storage medium of Example 9, wherein the computer-executable instructions further cause the processing system to: classify another set of inputs using the trained graph classifier machine learning model.

Example 14: The computer-readable storage medium of Example 8 wherein graph classifier machine learning model performs a sentiment analysis.

Example 15: A processing system, comprising: a processor; and a computer-readable storage medium having computer-executable instructions stored thereupon that, when executed by the processor, cause the processing system to: obtain a plurality of sets of embeddings for a plurality of sequences of log lines; construct a plurality of graphs from the plurality of sets of embeddings, wherein an individual graph of the plurality of graphs comprises nodes associated with an individual set of embeddings of the plurality of sets of embeddings, and wherein edges of the individual graph represent similarities between nodes of the individual graph; label the plurality of graphs based on a security classification criteria; and train a graph classifier machine learning model on the plurality of labeled graphs to identify security anomalies.

Example 16: The processing system of Example 15, wherein similarities between nodes represent distances between embeddings in an embedding space.

Example 17: The processing system of Example 15, wherein the graph classifier machine learning model comprises a graph convolutional network, a graph attention network, or a graph neural network.

Example 18: The processing system of Example 14, wherein the plurality of sets of embeddings are generated from the plurality of sets of inputs by an encoder machine learning model.

Example 19: The processing system of Example 18, wherein the encoder machine learning model comprises a large language model.

Example 20: The processing system of Example 18, wherein the computer-executable instructions further cause the processing system to: classify another set of inputs using the trained graph classifier machine learning model.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:

obtaining a plurality of sets of embeddings for a plurality of sets of inputs;

constructing a plurality of graphs from the plurality of sets of embeddings, wherein an individual graph of the plurality of graphs comprises nodes associated with an individual set of embeddings of the plurality of sets of embeddings, and wherein edges of the individual graph represent similarities between nodes of the individual graph;

labeling the plurality of graphs based on a classification criteria;

training a graph classifier machine learning model on the plurality of labeled graphs; and classifying another set of inputs using the trained graph classifier machine learning model.

2. The method of claim 1, wherein a set of inputs of the plurality of sets of inputs comprises a plurality of text snippets.

3. The method of claim 2, wherein the plurality of text snippets comprise a plurality of log lines.

4. The method of claim 1, wherein the similarity between two nodes of the individual graph is computed based on a cosine similarity of the two nodes or a Euclidian distance of the two nodes.

5. The method of claim 1, further comprising:

pruning edges from the individual graph based on a threshold similarity value.

6. The method of claim 1, further comprising:

pruning edges from the individual graph based on a k-nearest-neighbor algorithm.

7. The method of claim 1, wherein the plurality of sets of inputs comprise a plurality of sets of log lines, and wherein the classification criteria of an individual graph of the plurality of graphs is based on whether an individual set of log lines of the plurality of sets of log lines has been determined to be associated with a security anomaly.

8. A computer-readable storage medium having computer-executable instructions stored thereupon that, when executed by a processing system, cause the processing system to:

obtain a plurality of sets of embeddings for a plurality of sets of inputs;

construct a plurality of graphs from the plurality of sets of embeddings, wherein an individual graph of the plurality of graphs comprises nodes associated with an individual set of embeddings of the plurality of sets of embeddings, and wherein edges of the individual graph represent similarities between nodes of the individual graph;

label the plurality of graphs based on a classification criteria; and train a graph classifier machine learning model on the plurality of labeled graphs.

9. The computer-readable storage medium of claim 8, wherein the plurality of sets of embeddings are generated from the plurality of sets of inputs by an encoder machine learning model.

10. The computer-readable storage medium of claim 8, wherein the computer-executable instructions further cause the processing system to:

add an edge between a pair of nodes that have a shared attribute.

11. The computer-readable storage medium of claim 10, wherein the graph classifier machine learning model comprises a graph convolutional network architecture, a graph attention transformer, or a graph neural network.

12. The computer-readable storage medium of claim 8, wherein a graph of the plurality of graphs is classified based on a classification of the set of inputs of the plurality of sets of inputs used to construct the graph.

13. The computer-readable storage medium of claim 9, wherein the computer-executable instructions further cause the processing system to:

classify another set of inputs using the trained graph classifier machine learning model.

14. The computer-readable storage medium of claim 8 wherein graph classifier machine learning model performs a sentiment analysis.

15. A processing system, comprising:

a processor; and a computer-readable storage medium having computer-executable instructions stored thereupon that, when executed by the processor, cause the processing system to:

obtain a plurality of sets of embeddings for a plurality of sequences of log lines;

construct a plurality of graphs from the plurality of sets of embeddings, wherein an individual graph of the plurality of graphs comprises nodes associated with an individual set of embeddings of the plurality of sets of embeddings, and wherein edges of the individual graph represent similarities between nodes of the individual graph;

label the plurality of graphs based on a security classification criteria; and train a graph classifier machine learning model on the plurality of labeled graphs to identify security anomalies.

16. The processing system of claim 15, wherein similarities between nodes represent distances between embeddings in an embedding space.

17. The processing system of claim 15, wherein the graph classifier machine learning model comprises a graph convolutional network, a graph attention network, or a graph neural network.

18. The processing system of claim 15, wherein the plurality of sets of embeddings are generated from the plurality of sequences of log lines by an encoder machine learning model.

19. The processing system of claim 15, wherein the computer-executable instructions further cause the processing system to:

add a plurality of classification vertices to the plurality of graphs, wherein a classification vertex of the plurality of classification vertices is connected by a plurality of classification vertex edges to other vertices of a graph of the plurality of graphs, and wherein training the graph classifier machine learning model learns input feature importances for the plurality of classification vertex edges; and ranking an importance of the other vertices of the graph according to the learned input feature importances.

20. The processing system of claim 18, wherein the computer-executable instructions further cause the processing system to:

classify another sequence of log lines using the trained graph classifier machine learning model.

* * * * *